United States Patent
Gong et al.

(10) Patent No.: US 10,911,282 B2
(45) Date of Patent: Feb. 2, 2021

(54) CONTROL CHANNEL SENDING METHOD AND APPARATUS, AND RECEIVING METHOD AND APPARATUS

(71) Applicant: ZTE Corporation, Guangdong (CN)

(72) Inventors: Yuhong Gong, Guangdong (CN); Zhaohua Lu, Guangdong (CN); Shujuan Zhang, Guangdong (CN); Feng Bi, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 20 days.

(21) Appl. No.: 16/252,699

(22) Filed: Jan. 20, 2019

(65) Prior Publication Data

US 2019/0260620 A1    Aug. 22, 2019

Related U.S. Application Data

(63) Continuation of application No. PCT/CN2017/092230, filed on Jul. 7, 2017.

(30) Foreign Application Priority Data

Jul. 20, 2016    (CN) .......................... 2016 1 0575838

(51) Int. Cl.
*H04L 27/26* (2006.01)
*H04L 5/00* (2006.01)
(Continued)

(52) U.S. Cl.
CPC ............ *H04L 27/2613* (2013.01); *H04L 1/00* (2013.01); *H04L 5/0051* (2013.01);
(Continued)

(58) Field of Classification Search
CPC ..... H04L 27/2613; H04L 1/00; H04L 5/0051; H04L 5/0016; H04L 5/0094;
(Continued)

(56) References Cited

U.S. PATENT DOCUMENTS

2013/0121185 A1*  5/2013  Li .................... H04W 72/046
                                                        370/252
2017/0104517 A1    4/2017  Kakishima et al.
(Continued)

FOREIGN PATENT DOCUMENTS

CN    104796185 A    7/2015
CN    104955061 A    9/2015
(Continued)

OTHER PUBLICATIONS

Extended Search Report dated Jan. 31, 2020 for European Application No. 17830378.0, filed on Jul. 7, 2017 (10 pages).
(Continued)

*Primary Examiner* — Thai Nguyen
(74) *Attorney, Agent, or Firm* — Perkins Coie LLP

(57) ABSTRACT

Provided are a control channel sending method and apparatus, and receiving method and apparatus. The sending method comprises: a first device acquiring resource information about a first type of sending resources of a control channel; the first device determining a second type of sending resources of the control channel according to the resource information about the first type of sending resources, wherein the second type of sending resources are sending resources different from the first type of sending resources; and the first device sending, on the first type of sending resources and the second type of sending resources, the control channel to a second device. The invention solves the technical problem in the related art that the transmission efficiency of a control channel is relatively low due to the fact that a terminal applies a blind detection method to the control channel.

18 Claims, 9 Drawing Sheets

(51) Int. Cl.
*H04W 72/04* (2009.01)
*H04L 1/00* (2006.01)

(52) U.S. Cl.
CPC ....... *H04W 72/042* (2013.01); *H04W 72/046* (2013.01); *H04W 72/0446* (2013.01)

(58) Field of Classification Search
CPC .. H04L 5/0048; H04L 5/0053; H04W 72/042; H04W 72/0446; H04W 72/046; H04W 72/0406; H04B 7/0617
See application file for complete search history.

(56) References Cited

U.S. PATENT DOCUMENTS

2017/0303264 A1* 10/2017 Islam ................... H04L 5/0048
2018/0270844 A1    9/2018 Kim et al.

FOREIGN PATENT DOCUMENTS

| EP | 3 197 064 A1 | 7/2017 |
| WO | 2008/019706 A1 | 2/2008 |
| WO | 2014/098542 A1 | 6/2014 |
| WO | 2015/141066 A1 | 9/2015 |
| WO | 2016/041358 A1 | 3/2016 |
| WO | 2016/089122 A1 | 6/2016 |

OTHER PUBLICATIONS

International Search Report and Written Opinion dated Sep. 30, 2017 for International Application No. PCT/CN2017/092230, filed on Jul. 7, 2017 (12 pages).

* cited by examiner

CONTROL CHANNEL SENDING METHOD AND APPARATUS, AND RECEIVING METHOD AND APPARATUS

CROSS REFERENCE TO RELATED APPLICATIONS

This patent document is a continuation of and claims priority to International Patent Application No. PCT/CN2017/092230, filed on Jul. 7, 2017, which claims the benefit of priority of Chinese Patent Application No. 201610575838.2, filed on Jul. 20, 2016. The entire contents of the before-mentioned patent applications are incorporated by reference as part of the disclosure of this application.

TECHNICAL FIELD

The present disclosure relates to the field of communications, and in particular to a method and device for transmitting a control channel, and a method and device for receiving a control channel.

BACKGROUND

In a traditional cellular system, low-frequency band (such as 300 MHz to 3 GHz) spectrums are mainly used. However, with the increasing demands for communication services, the traditional low-frequency bands are becoming more and more occupied, and are insufficient to meet the requirements of future communications. Therefore, a developing trend of a future network is to apply high-frequency spectrum resources to mobile broadband communication.

The high-frequency communication has characteristics of relatively serious path loss and penetration loss, and spatial propagation of a high-frequency signal is closely related to the atmosphere. Since the wavelength of the high-frequency signal is extremely short, a large number of small antenna arrays can be used so that an accurate beam direction can be obtained with the beamforming technology. Thus, a narrow beam technology is taken advantage of to improve the coverage of the high-frequency signal and compensate for the transmission loss, which is a major characteristic of high-frequency communications.

In a Long Term Evolution (abbreviated as LTE) system, a terminal monitors and receives the physical downlink control channel by blind detection for each sub-frame (i.e. 1 ms). However, in the high-frequency communication system, a basic transmission unit is very small, normally in a microsecond (μs) level. Therefore, if the terminal still detects the control channel blindly, it will be too complex in reception, which affects the transmission on the control channel and further results in a low transmission efficiency of the control channel.

In view of the technical problem in the related art that the transmission efficiency of the control channel is low due to the blind detection by the terminal on the control channel, no effective solutions have been proposed yet.

SUMMARY

A method and device for transmitting a control channel, and a method and device for receiving a control channel is provided by embodiments of the present disclosure, with the purpose of at least solving the technical problem in the related art that the transmission efficiency of the control channel is low due to the blind detection by the terminal on the control channel.

According to an embodiment of the present disclosure, a method for transmitting a control channel is provided, including: acquiring, by a first device, resource information on a first type of transmission resources of the control channel; determining, by the first device, a second type of transmission resources of the control channel based on the resource information on the first type of transmission resources, wherein the second type of transmission resources is different from the first type of transmission resource; and transmitting, by the first device, the control channel to a second device using the first type of transmission resources and the second type of transmission resources.

Optionally, the first type of transmission resources includes at least one of a first transmission beam actually used for sending the control channel, a second transmission beam alternatively used for sending the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by a first demodulation reference signal, and a frequency domain resource occupied by the first demodulation reference signal.

Optionally, the second demodulation reference signal resource includes at least one of a second demodulation reference signal port, a second demodulation reference signal sequence, a parameter for generating the second demodulation reference signal sequence, a time domain resource occupied by a second demodulation reference signal, and a frequency domain resource occupied by the second demodulation reference signal.

Optionally, the first transmission beam is characterized by at least one of the following information: an identity of the first transmission beam, an identity of a beam group in which the first transmission beam is located, precoding corresponding to the first transmission beam, and a beamforming weight corresponding to the first transmission beam.

Optionally, the second transmission beam is characterized by at least one of the following information: an identity of the second transmission beam, an identity of a beam group in which the second transmission beam is located, precoding corresponding to the second transmission beam, and a beamforming weight corresponding to the second transmission beam.

Optionally, the second type of transmission resources includes at least one of a time domain resource location of the control channel, a time domain duration of the control channel, a frequency domain resource location of the control channel, a frequency domain bandwidth of the control channel, and a code domain resource of the control channel.

Optionally, the time domain resource location of the control channel includes at least one of a time domain start location or a time domain end location of the control channel. The frequency domain resource location of the control channel includes at least one of a frequency domain start location or a frequency domain end location of the control channel.

Optionally, the acquiring, by the first device, the resource information on the first type of transmission resources of the control channel includes: receiving, by the first device, feedback information from the second device, wherein the feedback information carries the resource information on the first type of transmission resources.

Optionally, the receiving, by the first device, the feedback information from the second device includes: transmitting, by the first device, a measurement reference signal to the second device, wherein the measurement reference signal is used to measure channel quality between the first device and the second device; and receiving, by the first device, the feedback information for feeding back the channel quality from the second device.

Optionally, in the feedback information, different first transmission beams are set with different priorities, different second transmission beams are set with different priorities, different first demodulation reference signal resources are set with different priorities, and different second demodulation reference signal resources are set with different priorities.

Optionally, the determining, by the first device, the second type of transmission resources of the control channel based on the resource information on the first type of transmission resources includes: determining, by the first device, the corresponding second type of transmission resources based on the resource information on the first type of transmission resources, according to a preset relationship between the first type of transmission resources and the second type of transmission resources.

Optionally, the preset relationship is prearranged by the first device and the second device, or is indicated to at least one of the first device or the second device by the network side through signaling.

Optionally, the preset relationship is a one-to-one correspondence or a many-to-one correspondence. In the one-to-one correspondence, one unit of resources in the first type of transmission resources corresponds to one unit of resources in the second type of transmission resources, and in the many-to-one correspondence, multiple units of resources in the first type of transmission resources correspond to one unit of resources in the second type of transmission resources.

Optionally, the preset relationship is a predefined functional relationship, wherein the functional relationship is used to determine the second type of transmission resources based on the first type of transmission resources.

Optionally, after acquiring, by the first device, the resource information on the first type of transmission resources of the control channel, the method further includes: notifying the second device, by the first device, of the resource information on the first type of transmission resources through signaling, wherein the signaling includes at least one of high-layer signaling, broadcasting signaling, and physical layer control signaling.

According to another embodiment of the present disclosure, a method for receiving a control channel is further provided, including: acquiring, by a second terminal, resource information on a first type of transmission resources of the control channel; determining, by the second device, a second type of transmission resources of the control channel based on the resource information on the first type of transmission resources, wherein the second type of transmission resources is different from the first type of transmission resource; and receiving, by the second device, the control channel using the first type of transmission resources and the second type of transmission resources.

Optionally, the first type of transmission resources includes at least one of a first transmission beam actually used for sending the control channel, a second transmission beam alternatively used for sending the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by a first demodulation reference signal, and a frequency domain resource occupied by the first demodulation reference signal.

Optionally, the second demodulation reference signal resource includes at least one of a second demodulation reference signal port, a second demodulation reference signal sequence, a parameter for generating the second demodulation reference signal sequence, a time domain resource occupied by a second demodulation reference signal, and a frequency domain resource occupied by the second demodulation reference signal.

Optionally, the first transmission beam is characterized by at least one of the following information: an identity of the first transmission beam, an identity of a beam group wherein the first transmission beam is located, precoding corresponding to the first transmission beam, and a beamforming weight corresponding to the first transmission beam.

Optionally, the second transmission beam is characterized by at least one of the following information: an identity of the second transmission beam, an identity of a beam group in which the second transmission beam is located, precoding corresponding to the second transmission beam, and a beamforming weight corresponding to the second transmission beam.

Optionally, the second type of transmission resources includes at least one of a time domain resource location of the control channel, a time domain duration of the control channel, a frequency domain resource location of the control channel, a frequency domain bandwidth of the control channel, and a code domain resource of the control channel.

Optionally, the time domain resource location of the control channel includes at least one of a time domain start location or a time domain end location of the control channel. The frequency domain resource location of the control channel includes at least one of a frequency domain start location or a frequency domain end location of the control channel.

Optionally, before acquiring, by the second device, the resource information on the first type of transmission resources, the method further includes: transmitting, by the second device, feedback information to the first device, wherein the feedback information carries the resource information on the first type of transmission resources.

Optionally, the transmitting, by the second device, feedback information to the first device includes: upon receiving a measurement reference signal indicating measured channel quality from the first device, transmitting, by the second device, the feedback information for feeding back the channel quality to the first device, wherein the measurement reference signal is used to measure the channel quality between the first device and the second device.

Optionally, in the feedback information, different first transmission beams are set with different priorities, different second transmission beams are set with different priorities, different first demodulation reference signal resources are set with different priorities, and different second demodulation reference signal resources are set with different priorities.

Optionally, the acquiring, by the second device, the resource information on the first type of transmission resources of the control channel includes: receiving, by the second device, signaling notified by the first device, wherein the signaling includes at least one of high-layer signaling, broadcasting signaling, and physical layer control signaling; and acquiring, by the second device, resource information on the first type of transmission resources carried in the signaling.

Optionally, the determining, by the second device, the second type of transmission resources of the control channel based on the resource information on the first type of transmission resources includes: determining, by the second device, the corresponding second type of transmission resources based on the resource information on the first type of transmission resources, according to a preset relationship between the first type of transmission resources and the second type of transmission resources.

Optionally, the preset relationship is prearranged by the first device and the second device, or is indicated to at least one of the first device or the second device by the network side through signaling.

Optionally, the preset relationship is a one-to-one correspondence or a many-to-one correspondence. In the one-to-one correspondence, one unit of resources in the first type of transmission resources corresponds to one unit of resources in the second type of transmission resources, and in the many-to-one correspondence, multiple units of resources in the first type of transmission resources correspond to one unit of resources in the second type of transmission resources.

Optionally, the preset relationship is a predefined functional relationship, wherein the functional relationship is used to determine the second type of transmission resources based on the first type of transmission resources.

According to another embodiment of the present disclosure, a device for transmitting a control channel is provided, the device includes: a first acquiring unit configured to acquire, through a first device, resource information on a first type of transmission resources of the control channel; a first determining unit configured to control the first device to determine a second type of transmission resources of the control channel based on the resource information on the first type of transmission resources, wherein the second type of transmission resources is different from the first type of transmission resource; and a first transmitting unit configured to control the first device to transmit the control channel to a second device using the first type of transmission resources and the second type of transmission resources.

Optionally, the first type of transmission resources includes at least one of a first transmission beam actually used for sending the control channel, a second transmission beam alternatively used for sending the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by a first demodulation reference signal, and a frequency domain resource occupied by the first demodulation reference signal.

Optionally, the second demodulation reference signal resource includes at least one of a second demodulation reference signal port, a second demodulation reference signal sequence, a parameter for generating the second demodulation reference signal sequence, a time domain resource occupied by a second demodulation reference signal, and a frequency domain resource occupied by the second demodulation reference signal.

Optionally, the first acquiring unit includes a receiving module configured to control the first device to receive feedback information from the second device, wherein the feedback information carries the resource information on the first type of transmission resources.

Optionally, the receiving module includes: a transmitting sub-module configured to control the first device to transmit a measurement reference signal to the second device, wherein the measurement reference signal is used to measure channel quality between the first device and the second device; and a receiving sub-module configured to receive, through the first device, feedback information for feeding back the channel quality from the second device.

Optionally, the first determining unit includes a first determining module configured to control the first device to determine the corresponding second type of transmission resources based on the resource information on the first type of transmission resources, according to a preset relationship between the first type of transmission resources and the second type of transmission resources.

Optionally, the preset relationship is prearranged by the first device and the second device, or is indicated to at least one of the first device or the second device by the network side through signaling.

Optionally, the preset relationship is a one-to-one correspondence or a many-to-one correspondence. In the one-to-one correspondence, one unit of resources in the first type of transmission resources corresponds to one unit of resources in the second type of transmission resources, and in the many-to-one correspondence, multiple units of resources in the first type of transmission resources correspond to one unit of resources in the second type of transmission resources.

Optionally, the preset relationship is a predefined functional relationship, wherein the functional relationship is used to determine the second type of transmission resources based on the first type of transmission resources.

According to another aspect of the embodiment of the present disclosure, a device for receiving a control channel is further provided, the device includes: a second acquiring unit configured to acquire resource information on a first type of transmission resources of a control channel through a second device; a second determining unit configured to control the second device to determine a second type of transmission resources of the control channel based on the resource information on the first type of transmission resources, wherein the second type of transmission resources is different from the first type of transmission resource; and a receiving unit configured to control the second device to receive the control channel using the first type of transmission resources and the second type of transmission resources.

Optionally, the first type of transmission resources includes at least one of a first transmission beam actually used for sending the control channel, a second transmission beam alternatively used for sending the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by a first demodulation reference signal, and a frequency domain resource occupied by the first demodulation reference signal.

Optionally, the second demodulation reference signal resource includes at least one of a second demodulation reference signal port, a second demodulation reference signal sequence, a parameter for generating the second demodulation reference signal sequence, a time domain resource occupied by a second demodulation reference signal, and a frequency domain resource occupied by the second demodulation reference signal.

Optionally, the device further includes: a second transmitting unit configured to, before the second device acquires the resource information on the first type of transmission resources of the control channel, control the second device to transmit feedback information to the first device, wherein the feedback information carries the resource information on the first type of transmission resources.

Optionally, the second transmitting unit includes: a transmitting module configured to control the second device, upon receiving a measurement reference signal indicating measured channel quality from the first device, to transmit the feedback information for feeding back the channel quality to the first device, wherein the measurement reference signal is used to measure the channel quality between the first device and the second device.

Optionally, in the feedback information, different first transmission beams are set with different priorities, different second transmission beams are set with different priorities, and different first demodulation reference signal resources are set with different priorities, and different second demodulation reference signal resources are set with different priorities.

Optionally, the second acquiring unit includes: a second receiving module configured to receive signaling notified by the first device, through the second device, wherein the signaling includes at least one of high-layer signaling, broadcasting signaling and physical layer control signaling; and an acquiring module configured to acquire the resource information on the first type of transmission resources carried in the signaling, through the second device.

Optionally, the second determining unit includes a second determining module configured to control the second device to determine the corresponding second type of transmission resources based on the resource information on the first type of transmission resources, according to a preset relationship between the first type of transmission resources and the second type of transmission resources.

Optionally, the preset relationship is prearranged between the first device and the second device, or indicated to the first device and the second device by the network side through signaling.

Optionally, the above preset relationship is a one-to-one correspondence or a many-to-one correspondence. In the one-to-one correspondence, one unit of resources in the first type of transmission resources corresponds to one unit of resources in the second type of transmission resources, and in the many-to-one correspondence, multiple units of resources in the first type of transmission resources correspond to one unit of resources in the second type of transmission resources.

Optionally, the above preset relationship is a predefined functional relationship, and the functional relationship is used to determine the second type of transmission resources based on the first type of transmission resources.

A storage medium is provided according to another embodiment of the present disclosure, which may be configured to store program codes for executing the following steps: controlling a first device to acquire resource information on a first type of transmission resources of the control channel; controlling the first device to determine a second type of transmission resources of the control channel based on the resource information on the first type of transmission resources, wherein the second type of transmission resources is different from the first type of transmission resource; and controlling the first device to transmit the control channel to a second device using the first type of transmission resources and the second type of transmission resources.

Optionally, the storage medium may be further configured to store program codes for executing the following steps: controlling a second device to acquire resource information on a first type of transmission resources of the control channel; controlling the second device to determine a second type of transmission resources of the control channel based on the resource information on the first type of transmission resources, wherein the second type of transmission resources is different from the first type of transmission resource; and controlling the second device to receive the control channel using the first type of transmission resources and the second type of transmission resources.

A storage medium is further provided according to yet another embodiment of the present disclosure, having programs stored thereon which, when being running, perform any of the above described methods for transmitting the control channel, or any of the above described methods for receiving the control channel.

In the embodiments of the present disclosure, the first device acquires resource information on a first type of transmission resources of the control channel, and determines a second type of transmission resources of the control channel based on the resource information on the first type of transmission resources, wherein the second type of transmission resources is different from the first type of transmission resource; the first device transmits the control channel to a second device using the first type of transmission resources and the second type of transmission resources, thereby solving the technical problem in the related art that the transmission efficiency of the control channel is low due to the blind detection by the terminal on the control channel, and improving the transmission efficiency of the control channel.

BRIEF DESCRIPTION OF DRAWINGS

The accompanying drawings illustrated herein are used to provide further understanding of the present disclosure, and constitute a part of the present disclosure. The schematic embodiments of the present disclosure and the illustration thereof are used to interpret the present disclosure, rather than improperly limiting the present disclosure. In the accompanying drawings.

DETAILED DESCRIPTION

The present disclosure will be described in detail below in conjunction with the embodiments with reference to the accompanying drawings. It should be noted that the embodiments in the present disclosure and the features in the embodiments may be combined with each other as long as they do not conflict with each other.

It should be noted that the terms "first", "second", and the like in the specification, the claims and the above accompanying drawings of the present disclosure are used for distinguishing similar objects, rather than describing a particular sequence or order.

First Embodiment

Figure 1:
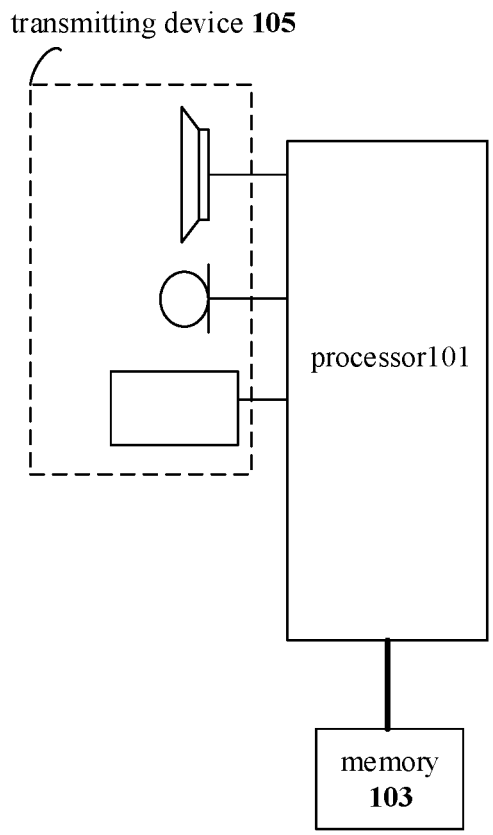
FIG. 1 is a schematic diagram of an optional computer terminal according to an embodiment of the present disclosure.

The method embodiment provided in first embodiment of the present disclosure can be implemented in a mobile terminal, a computer terminal or a similar computing device. Taking the computer terminal for implementing the method as an example, as shown in FIG. 1, the computer terminal may include one or more (only one shown in FIG. 1) processors 101 (the processor 101 may include but is not limited to a microprocessor MCU, a programmable logic device, FPGA or other processing devices), a memory 103 for storing data, and a transmission device 105 for communication. It should be understood by those skilled in the art that the structure shown in FIG. 1 is merely illustrative, and does not limit the structure of the above electronic devices.

The memory 103 may be used to store software programs and modules of application software, such as program instructions/modules corresponding to a control method for a device according to the embodiment of the present disclosure. The processor 101 implements various functional applications and data processing by running the software programs and modules stored in the memory 103, thereby implementing the above method. The memory may include high-speed random access memory, and may also include non-volatile memory such as one or more magnetic storage devices, flash memory or other non-volatile solid state memory. In some examples, the memory may further include memories disposed remotely from the processor, which may be connected to the computer terminal over network. Examples of the above network include but are not limited to the Internet, Intranet, local area network, mobile communication network, and a combination thereof.

The transmission device is used for receiving or transmitting data via a network. Specifically, the above network may include, for example, a wireless network provided by a communication provider of the computer terminal. In one example, the transmission device includes a Network Interface Controller (NIC), which may be connected to other network devices through a base station so that it can communicate with the Internet. In one example, the transmission device may be a Radio Frequency (RF) module which communicates wirelessly with the Internet.

According to an embodiment of the present disclosure, a method embodiment of a method for transmitting a control channel is provided. It should be noted that the steps shown in the flowchart of the accompanying drawings may be executed in a computer system such as a set of computer executable instructions. Also, while a logical sequence is shown in the flowchart, the steps as shown or described may in some cases be executed in an order other than that described herein.

Figure 2:
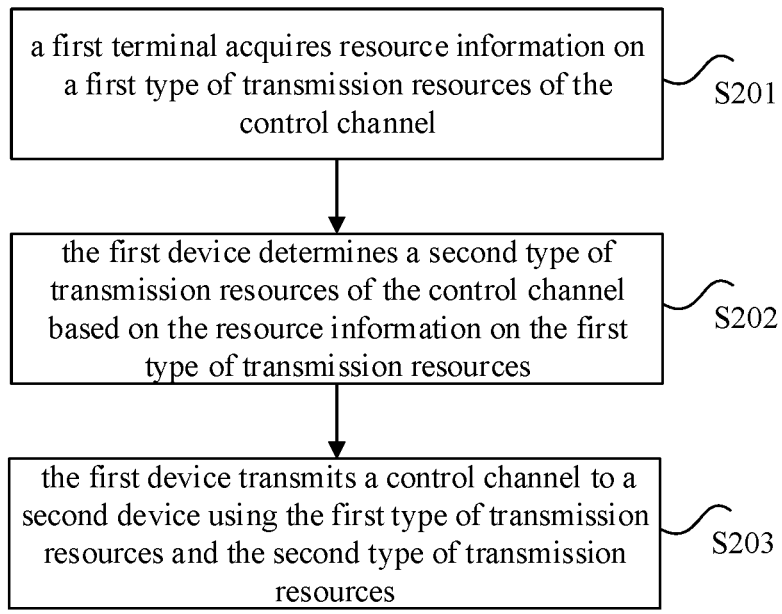
FIG. 2 is a flowchart of a method for transmitting a control channel according to an embodiment of the present disclosure.

FIG. 2 is a flowchart of a method for transmitting a control channel according to an embodiment of the present disclosure. As shown in FIG. 2, the method includes steps S201 to S203.

In step S201, a first terminal acquires resource information on a first type of transmission resources of the control channel.

The above control channel is a physical channel for transmitting control information.

In step S202, the first device determines a second type of transmission resources of the control channel based on the resource information on the first type of transmission resources. The second type of transmission resources is predefined and different from first type of transmission resources.

In step S203, the first device transmits the control channel to a second device using the first type of transmission resources and the second type of transmission resources.

According to the above embodiment, the first device acquires resource information on a first type of transmission resources of the control channel and determines a second type of transmission resources of the control channel based on the resource information on the first type of transmission resources, wherein the second type of transmission resources is different from the first type of transmission resources, and the first device transmits a control channel to a second device using the first type of transmission resources and the second type of transmission resources, thereby solving the technical problem in the related art that the transmission efficiency of the control channel is low due to the blind detection by the terminal on the control channel, and improving the transmission efficiency of the control channel.

It should be noted that the first device is a transmitting end of the control channel, and the second device is a receiving end of the control channel. For example, for downlink transmission in a cellular network system, the first device is a base station, and correspondingly, the second device is a terminal; for uplink transmission in a cellular network system, the first device is a terminal, and correspondingly, the second device is a base station; in device-to-device (D2D) communications, the first device is terminal 1, and correspondingly, the second device is terminal 2.

In the above embodiment, the first type of transmission resources includes at least one of a first transmission beam actually used for sending the control channel, a second transmission beam alternatively used for sending the control channel, i.e. a transmission beam which is available for sending the control channel, a first demodulation reference signal resource actually used for transmitting the control channel, and a second demodulation reference signal resource alternatively used for transmitting the control channel, i.e. a demodulation reference signal which is available for transmitting the control channel.

The above first demodulation reference signal resource includes at least one of a first demodulation reference signal port, a first demodulation reference signal sequence, a parameter for generating the first demodulation reference signal sequence, time domain resource occupied by a first demodulation reference signal, and frequency domain resource occupied by the first demodulation reference signal. The second demodulation reference signal resource includes at least one of a second demodulation reference signal port, a second demodulation reference signal sequence, a parameter for generating the second demodulation reference signal sequence, time domain resource occupied by a second demodulation reference signal, and frequency domain resource occupied by the second demodulation reference signal. The first transmission beam is characterized by at least one of the following information: an identity of the first transmission beam, an identity of a beam group in which the first transmission beam is located, precoding corresponding to the first transmission beam, and a beamforming weight corresponding to the first transmission beam. The second transmission beam is characterized by at least one of the following information: an identity of the second transmission beam, an identity of a beam group in which the second transmission beam is located, precoding corresponding to the second transmission beam, and a beamforming weight corresponding to the second transmission beam.

It should be noted that the transmission beam of the control channel refers to a beam sent after weighting with a precoding weight or weighting with a beamforming weight, wherein different precoding weights or beamforming weights correspond to different transmission beams.

Optionally, the second type of transmission resources includes at least one of a time domain resource location of the control channel, a time domain duration of the control channel, a frequency domain resource location of the control channel, a frequency domain bandwidth of the control channel, and code domain resource of the control channel.

The above code domain resource of the control channel refers to information in the transmission of information bits of the control channel, in which some code domain information, for example, an Orthogonal Cover Code (OCC), is added. Different code domain resources may be used to transmit different control channels.

Specifically, the time domain resource location of the control channel includes at least one of a time domain start location or a time domain end location of the control channel. The frequency domain resource location of the control channel includes at least one of a frequency domain start location or a frequency domain end location of the control channel.

In step S201, the first device acquiring the resource information on the first type of transmission resources of the control channel includes the first device receiving feedback information from the second device. The feedback information carries the resource information on the first type of transmission resources.

Specifically, the first device receiving feedback information from the second device includes: the first device transmitting a measurement reference signal to the second device, wherein the measurement reference signal is used to measure channel quality between the first device and the second device; and the first device receiving feedback information for feeding back the channel quality from the second device, wherein the feedback information carries the resource information on the first type of transmission resources.

After acquiring the resource information on the first type of transmission resources of the control channel, the first device may notify the second device of the resource information on the first type of transmission resources through signaling. The signaling includes at least one of high-layer signaling, broadcasting signaling, and a physical layer control signaling.

Specifically, the first type of transmission resources of the control channel can be obtained based on channel measurement, beam training or beam scanning or beam tracking. Typically, the control channel is used to indicate scheduling of a data channel (for example, time-frequency resources occupied by the data channel, a modulation coding level used for transmission of the data channel, indication of a transmission diversity or multiplexing scheme of the data channel). Therefore, before transmitting the control channel, channel measurement, beam training, beam scanning or beam tracking are typically performed to assist the base station in scheduling user data. The second device obtains the first type of transmission resources of the control channel based on a result of the channel measurement and feeds it back to the first device. Alternatively, the second device obtains recommendation values (that is, candidate resources) for the first type of transmission resources of the control channel based on the result of the channel measurement, and feeds them back to the base station, and the base station selects the first type of transmission resources of the control channel from the candidate resources according to the actual situation, and notifies the second device of information on the first type of transmission resources. Here, before the first device transmits the control channel, the network side may notify the second device of the information on the first type of transmission resources through signaling (for example, high-layer signaling, broadcasting signaling or other physical layer control channel).

It should be noted that in the feedback information, different first transmission beams are set with different priorities, different second transmission beams are set with different priorities, different first demodulation reference signal resources are set with different priorities, and different second demodulation reference signal resources are set with different priorities. That is, if the feedback information carries information on multiple first transmission beams, a first transmission beam with the highest priority is determined as the actual transmission beam. Similarly, this also applies to the first demodulation reference signal resources. When determining the second type of transmission resource, a corresponding second transmission resources is determined according to a resource with the highest priority (such as the first transmission beam with the highest priority and the first demodulation reference signal resource with the highest priority) in the first transmission resources.

In step S202, the first device determining a second type of transmission resources of the control channel based on the resource information on the first type of transmission resources includes the first device determining a corresponding second type of transmission resources based on the resource information on the first type of transmission resources, according to a preset relationship between the first type of transmission resources and the second type of transmission resources. Here, the preset relationship is prearranged by the first device and the second device, or is indicated to at least one of the first device or the second device by a network side through signaling.

The preset relationship may be a one-to-one correspondence, a many-to-one correspondence or a one-to-many correspondence. In the one-to-one correspondence, one unit of resource in the first type of transmission resources corresponds to one unit of resource in the second type of transmission resources. In the many-to-one correspondence, multiple units of resources in the first type of transmission resources correspond to one unit of resource in the second type of transmission resources. In the one-to-many correspondence, multiple units of resources in the second type of transmission resources correspond to one unit of resources in the first type of transmission resources.

The above preset relationship may also be a predefined functional relationship, and the functional relationship is used to determine the second type of transmission resources based on the first type of transmission resources.

Specifically, there is a fixed correspondence between the first type of transmission resources of the control channel and the second type of transmission resources. The correspondence is predefined, or is prearranged by the first device and the second device, or is notified to the first device and the second device by the network side through signaling. A specific correspondence includes: a one-to-one correspondence between a transmission beam or a candidate transmission beam or a demodulation reference signal or a candidate demodulation reference signal (i.e. one unit of resources in the first type of transmission resources described above) of the control channel and time-frequency resource (i.e., one unit of resources in the second type of transmission resources described above) for transmitting the control channel, or a many-to-one correspondence between transmission beams or candidate transmission beams or demodulation reference signals or candidate demodulation reference signals of the control channel and time-frequency resource for transmitting the control channel.

In addition, the preset relationship between the first type of transmission resources and the second type of transmission resources of the control channel may be determined by a certain functional relationship, and the function is predefined. For example, a resource index of the control channel may be determined by bringing a beam identity of the control channel into the functional relationship. Of course, input parameters of the functional relationship may not merely contain the beam identity of the control channel, or rather, the input parameters can also be related to one or more other parameters, such as a user identity (UE identity, abbreviated as UE ID).

For the second device serving as the receiving end, the receiving end (i.e. the second device) determines the second type of transmission resources based on the first type of transmission resources of the control channel, and receives the control channel using the first type of transmission resources and the second type of transmission resources. Herein, an optional range of the second type of transmission resources is determined based on the first type of transmission resources of the control channel, such that the receiving end receives the control channel thereof in the optional range in a blind detection manner.

When the second device feeds the first type of transmission resources back to the first device, resources in the first type of transmission resources (for example, different transmission beams, different candidate transmission beams, different demodulation reference signals or different candidate demodulation reference signals) are ranked according to priorities thereof. That is, different resources in the first type of transmission resources fed back have different priorities. Information on the priorities is contained in the first type of transmission resources fed back by the second device to the first device.

Upon receiving information on the first transmission resources carrying information on the priorities, the transmitting end (that is, the first device) may select the actual transmission beam or actual demodulation reference signal for the control channel according to the priorities. When the receiving end determines the second type of transmission resources based on the first type of transmission resources, the receiving end may determine the second type of transmission resources or an optional range thereof based on a descending order of the priorities of the first type of transmission resources, and attempts to receive the control channel. Once the control channel of the receiving end is detected in a certain first type of transmission resources and the corresponding second type of transmission resources, the receiving of the control channel using the remaining first type of transmission resources and the corresponding second type of transmission resources is no longer performed. Therefore, the reception for the control channel is completed, thereby reducing the reception complexity of the receiving end.

The embodiments of the present disclosure are described in detail below in conjunction with specific implementations.

First Implementation

Each transmission beam is bonded with one time-frequency resource of the control channel.

Figure 3:
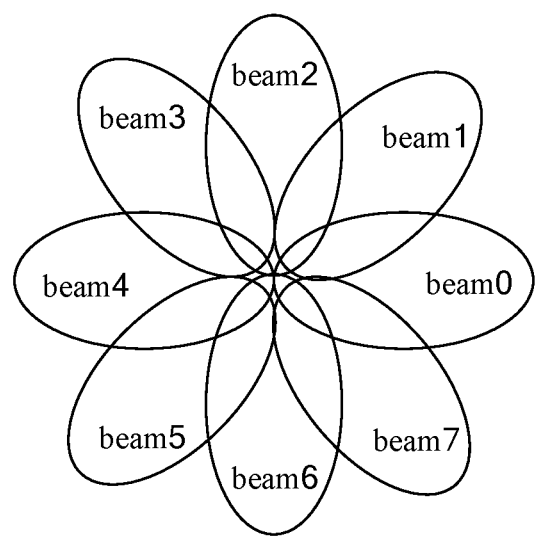
FIG. 3 is a schematic diagram of an optional transmission beam according to an embodiment of the present disclosure.
Figure 4A:
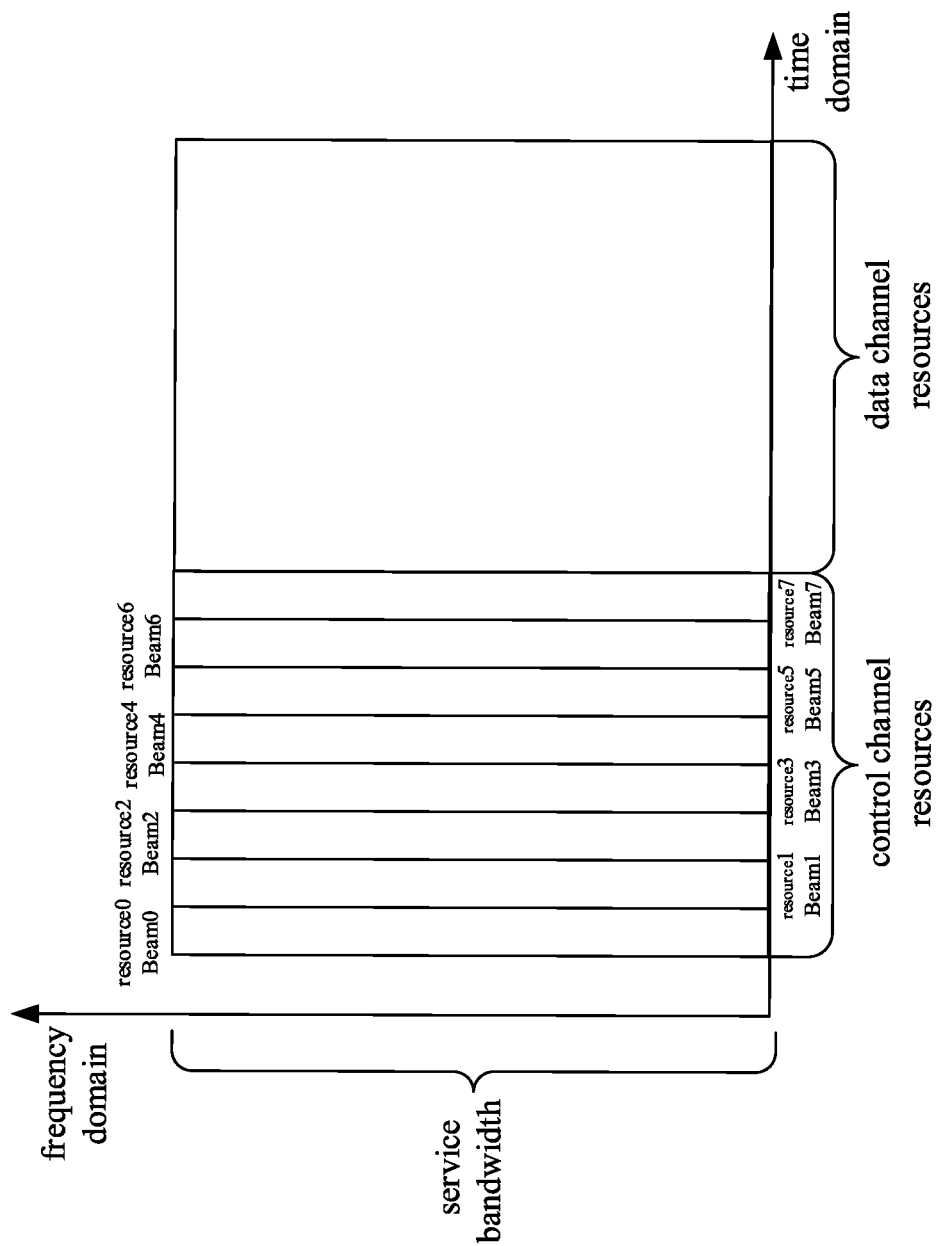
FIG. 4*a* is a schematic diagram of an optional correspondence according to an embodiment of the present disclosure.
Figure 4B:
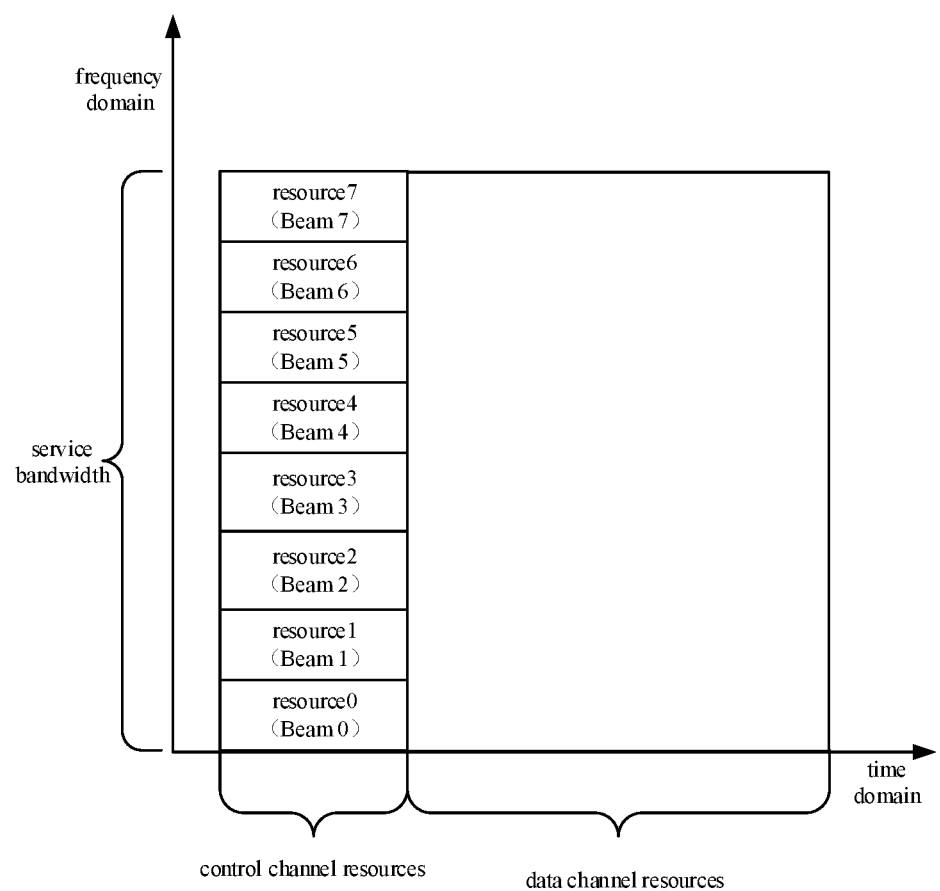
FIG. 4*b* is a schematic diagram of an optional correspondence according to an embodiment of the present disclosure.
Figure 4C:
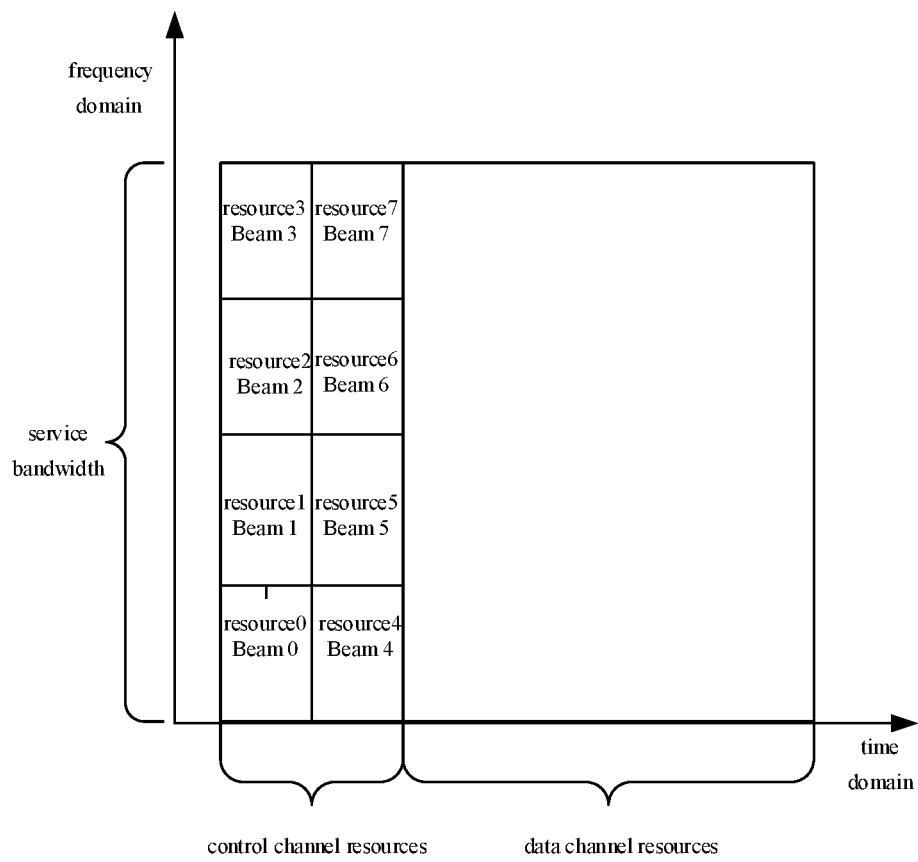
FIG. 4*c* is a schematic diagram of an optional correspondence according to an embodiment of the present disclosure.

As shown in FIG. 3 and FIG. 4 (including FIG. 4a, FIG. 4b and FIG. 4c), it is assumed that the base station is provided with a total of eight transmission beams (beam 0 to beam 7 respectively) which is available to transmit the control channel. The numbering or beam identity (abbreviated as Beam ID) of the i-th transmission beam is i, where i is an integer less than 8.

The base station reserves N time-frequency resources for transmission of a downlink control channel, where N is equal to the number of transmission beams which is available for transmitting the downlink control channel, that is, N=8. The eight transmission beams have a one-to-one correspondence with eight downlink control channel time-frequency resources. The correspondence is predefined (that is, the correspondence is prearranged by the base station and the terminal), or is notified to the terminal by the base station through signaling (for example, high-layer signaling, broadcasting signaling, and the like). FIG. 4a, FIG. 4b, and FIG. 4c are three schematic diagrams respectively showing the correspondence between downlink control channel resources (i.e. resource 0 to resource 7 shown in FIG. 4) and transmission beams thereof (Beam0 to Beam7). In FIG. 4a, different downlink control channel resources are grouped in a time grouping manner, that is, the different downlink control channel resources are grouped in the time domain. In FIG. 4b, different downlink control channel resources are grouped in a frequency grouping manner, that is, the different downlink control channel resources are grouped in the frequency domain. In FIG. 4c, different downlink control channel resources are grouped in a time-frequency mixed manner, in which a control channel transmission beam has a one-to-one correspondence with a respective downlink control channel resource, based on a fixed order. It should be noted that the order of correspondences given in FIG. 4a to FIG. 4c is only exemplary, and the order of correspondences between the transmission beams and the control channel resources is not limited to what has been described above. Different control channel resources may be grouped in at least one of a time domain, a frequency domain, and a code domain.

It should be noted that in FIG. 4a to FIG. 4c, a time-domain axis denotes the control channel resource, and a frequency-domain axis denotes service bandwidth. Different control channel resources correspond to different beams, for example, Beam0 corresponds to resource 0.

The terminal measures state quality information on the downlink channel, and feeds back the measured state information on the downlink channel or information on a preferred transmission beam (or a candidate transmission beam) for the downlink control channel corresponding to the terminal, obtained based on the state information on the downlink channel, to the base station. Thereby, the base station obtains information on the first type of transmission resources of the downlink control channel corresponding to the terminal, i.e., information on the candidate transmission beams.

Upon receiving the information on the candidate transmission beams, the base station directly uses the candidate transmission beam as the transmission beam for the control channel, and transmits the downlink control channel using a control channel resource corresponding to the candidate transmission beam. Alternatively, the base station selects a transmission beam for the control channel from the candidate transmission beams based on a scheduling situation (for example, a transmission scheme of the control channel, whether other users have already occupied the beam of the candidate transmission beams), and transmits the control channel through the beams using the control channel resource corresponding to the selected transmission beam.

The terminal side determines a control channel receiving resource based on the transmission beam for the control channel. If the base station directly transmits the control channel by using the candidate transmission beam as the transmission beam for the control channel, the terminal directly determines the control channel resource based on the correspondence between the transmission beam and the control channel resource, and receives the control channel on the resource. If the base station selects one or more transmission beams from the candidate transmission beams according to a certain rule to transmit the control channel, the terminal determines an optional range of the control channel resource based on the correspondence between the transmission beam and the control channel. For example, if the candidate transmission beams are 1, 2 and 3, the possible range of control channel resource will be control channel resource 1, control channel resource 2 and control channel resource 3, and the terminal monitors and blindly detects the control channel using these control channel resources.

It should be noted that the control channel is only transmitted using the above control channel resources. Alternatively, other channels or signals are transmitted using the control channel resources which are not occupied by any control channel. For example, a data channel is allowed to be transmitted using the control channel resources which are not occupied by any control channel.

Optionally, if the base station selects one or more transmission beams from the candidate transmission beams according to a certain rule to transmit the control channel, and indicates information on the selected transmission beams to the terminal, then the terminal may directly determine a control channel transmission resource based on the selected transmission beams, and receive the control channel on the transmission resource. Here, the information on the selected transmission beam by the base station is indicated to the terminal before the control channel is transmitted. For example, the information is indicated to the terminal through high-layer signaling, broadcasting signaling or physical layer control signaling. Specifically, if the control channel is a second-level control channel, a first-level control channel is present before the second-level control channel is transmitted. One of the functions of the first-level control channel is to indicate some transmission information of the second-level control channel to the terminal, for example, information on the transmission beam.

Optionally, the above correspondence between the transmission beam and the control channel resource may also be equivalently replaced by a correspondence between the demodulation reference signal resource of the control channel and the control channel resource. For example, in the base station, there are a total of eight transmission beams which may is available to transmit the control channel. Here, different transmission beams correspond to different demodulation reference signal resources of the control channel, and different demodulation reference signal resources correspond to different control channel resources. The demodulation reference signal resource includes at least one of a demodulation reference signal port, a demodulation reference signal sequence, a parameter for generating a demodulation reference signal sequence, and a time-frequency resource occupied by the demodulation reference signal.

Second Implementation

Multiple transmission beams are bonded with one common time-frequency resource of the control channel.

Figure 5A:
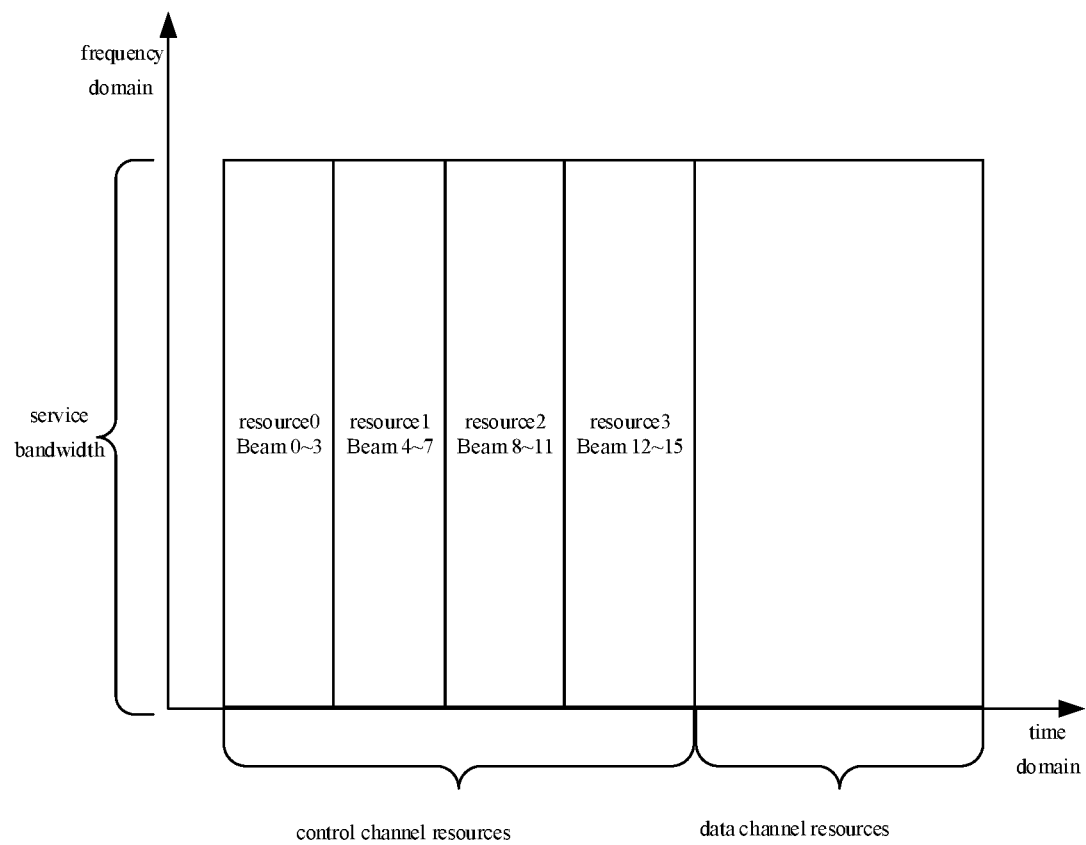
FIG. 5*a* is a schematic diagram of an optional correspondence according to an embodiment of the present disclosure.
Figure 5B:
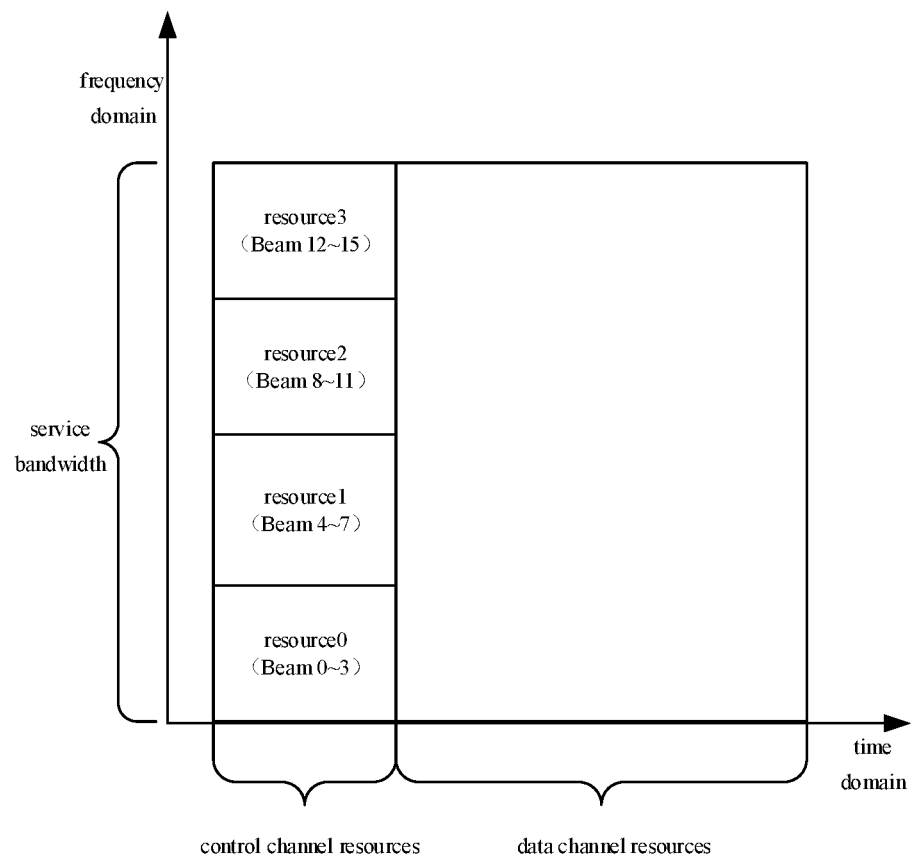
FIG. 5*b* is a schematic diagram of an optional correspondence according to an embodiment of the present disclosure.
Figure 5C:
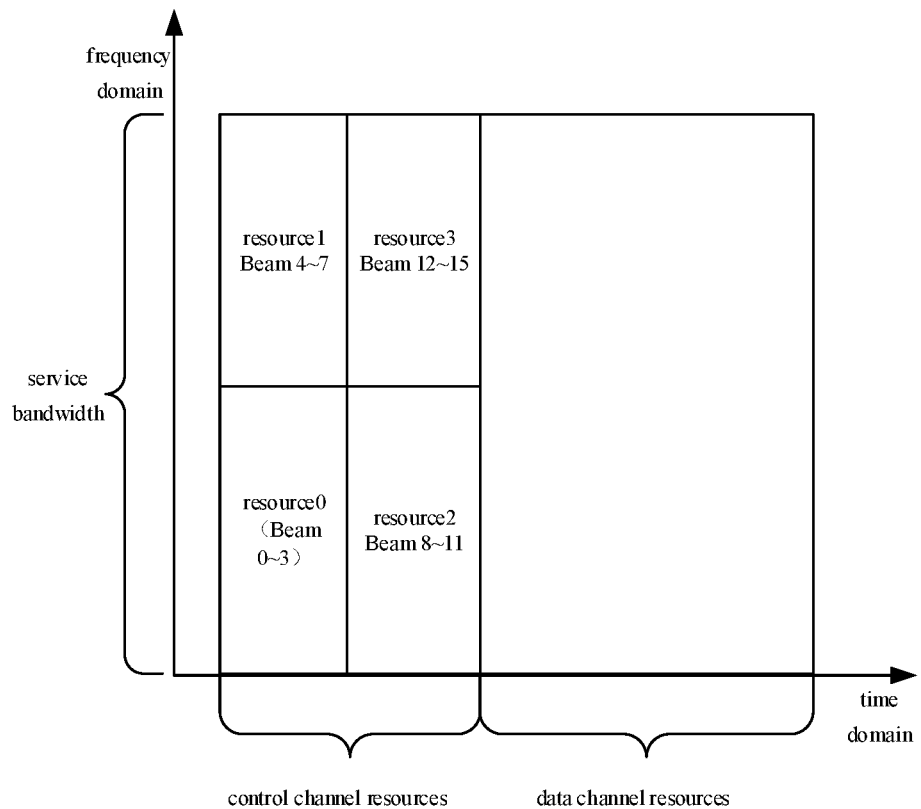
FIG. 5*c* is a schematic diagram of an optional correspondence according to an embodiment of the present disclosure.

As shown in FIG. 5 (including FIG. 5a, FIG. 5b and FIG. 5c), it is assumed that the base station is provided with a total of M transmission beams which is available to transmit the downlink control channel, wherein the numbering or beam identity (abbreviated as Beam ID) of the i-th transmission beam is i, and i is an integer less than M.

The base station reserves N downlink control channel resources to transmit a downlink control channel, where N is less than the number of transmission beams which is available for transmitting the downlink control channel, that is, N<M. There is a fixed correspondence between the M transmission beams of the base station and the N downlink control channel resources. The correspondence is predefined, or prearranged by the base station and the terminal, or is notified to the terminal by the base station through signaling (for example, high-layer signaling, broadcasting signaling, or the like). FIG. 5a, FIG. 5b, and FIG. 5c are schematic diagrams showing the correspondence between transmission beams (Beam0 to Beam15) of the base station and downlink control channel transmission resources (Resource 0 to Resource 3) in a case of M=16 and N=4, respectively. In FIG. 5a, different downlink control channel resources are grouped in a time grouping manner. In FIG. 5b, different downlink control channel resources are grouped in a frequency grouping manner. In FIG. 5c, different downlink control channel resources are grouped in a time-frequency mixed manner. Different control channel transmission beams are grouped into different groups based on a fixed grouping manner, and the groups of the control channel transmission beams have a one-to-one correspondence with the different downlink control channel transmission resources. It should be noted that the grouping manner of the transmission beams and the correspondence between the groups of the transmission beams and the downlink control channel resources given in FIG. 5a to FIG. 5c are only exemplary, and the grouping of the transmission beams and the correspondence between the groups of the transmission beams and the control channel resources are not limited to what has been described above. Different control channel resources may be grouped according to at least one of a time domain resource, a frequency domain resource, and a code domain resource.

It should be noted that in FIG. 5a to FIG. 5c, a time-domain axis denotes the control channel resource, and a frequency-domain axis denotes service bandwidth. Different control channel resources correspond to different beam groups. For example, Beam0 to Beam3 (that is, Beam0 to Beam3 in FIG. 5) correspond to resource 0.

The terminal measures state quality information on the downlink channel, and feeds back the measured state information on the downlink channel or information on a preferred transmission beam (or a candidate transmission beam) for the downlink control channel corresponding to the terminal, obtained based on the state information on the downlink channel, to the base station. Thereby, the base station obtains information on the first type of transmission resources of the downlink control channel corresponding to the terminal, i.e., information on the candidate transmission beam.

Upon receiving the information on the candidate transmission beam, the base station directly uses the candidate transmission beam as the transmission beam for the control channel, and transmits the downlink control channel on a control channel resource corresponding to the candidate transmission beam. Alternatively, the base station selects a transmission beam for the control channel from the candidate transmission beams based on a scheduling situation (for example, a transmission scheme of the control channel, whether the beam of the candidate transmission beams have been already occupied by other user), and transmits the control channel through the beam using the control channel resource corresponding to the selected transmission beam.

The terminal side determines a control channel receiving resource based on the transmission beam for the control channel. If the base station directly transmits the control channel by using the candidate transmission beam as the transmission beam for the control channel, the terminal directly determines the control channel resource based on the correspondence between the transmission beam and the control channel resource, and receives the control channel on the resource. For example, if the candidate transmission beams for the control channel are beams 3 and 4, then the terminal blindly detects the control channel on control channel resources 0 and 1. If the base station selects one or more transmission beams from the candidate transmission beams according to a certain rule to transmit the control channel, the terminal firstly determines a range of control channel resources according to the correspondence between the transmission beam and the control channel. For example, if the candidate transmission beams are Beam3 and Beam4, and the base station selects Beam3 for transmitting the control channel for the terminal, then the terminal monitors and receives the control channel of the terminal using a control channel resource corresponding to Beam3, i.e., control channel resource 0.

It should be noted that only the control channel is transmitted using the above control channel resource. Alternatively, other channels or signals are transmitted using the control channel resources which are not occupied by any control channel. For example, a data channel is transmitted using these control channel resources which are not occupied by any control channel.

Optionally, if the base station selects one or more transmission beams from the candidate transmission beams according to a certain rule to transmit the control channel, and indicates information on the selected transmission beams to the terminal, then the terminal may directly determine a control channel transmission resource based on the selected transmission beams, and receive the control channel on the transmission resource. The information on the selected transmission beam by the base station is indicated to the terminal before the control channel is transmitted. For example, the information is indicated to the terminal through high-layer signaling, broadcasting signaling or physical layer control signaling. Specifically, if the control channel is a second-level control channel, a first-level control channel is present before the second-level control channel is transmitted. One of the functions of the first-level control channel is to indicate some transmission information of the second-level control channel to the terminal, for example, information on the transmission beam.

Optionally, the above correspondence between the transmission beam and the control channel resource may also be equivalently replaced by a correspondence between the demodulation reference signal resource of the control channel and the control channel resource. For example, the base station is provided with a total of 16 transmission beams which is available to transmit the control channel. Here, different transmission beams correspond to different demodulation reference signal resources of the control channel, and different demodulation reference signal resources correspond to different control channel resources. The demodulation reference signal resource includes at least one of a demodulation reference signal port, a demodulation reference signal sequence, a parameter for generating the demodulation reference signal sequence, and a time-frequency resource occupied by the demodulation reference signal.

Third Implementation

The feedback information includes the first type of transmission resources ranked by priority.

The terminal measures state quality information on the downlink channel, and feeds back the measured state information on the downlink channel or information on candidate transmission beams for the downlink control channel corresponding to the terminal, obtained based on the state information on the downlink channel, to the base station. Further, the terminal ranks the candidate transmission beams by priority according to a certain rule. For example, priorities of the transmission beams are ranked from high to low according to a received Signal to Interference and Noise Ratio (SINR), the throughput or capacity under different transmission beams, and information on the ranked candidate transmission beams is fed back to the base station. Thereby, the base station obtains information on the first type of ranked transmission resources (i.e. information on the candidate transmission beams) of the downlink control channel corresponding to the terminal.

Upon receiving information on the candidate transmission beams, the base station determines a transmission beam for the control channel according to a descending order of the priorities of the candidate transmission beams. Meanwhile, considering scheduling conditions of other users, for example, in a case that a transmission beam with the highest priority (i.e., an optimal transmission beam) in the candidate transmission beams has already been occupied by another user, the base station will select a suboptimal transmission beam from the candidate transmission beams as the actual transmission beam for the control channel, and transmits the control channel using this transmission beam.

The M transmission beams of the base station have a fixed correspondence with the N downlink control channel resources. The correspondence is predefined, or prearranged by the base station and the terminal, or is notified to the terminal by the base station through signaling (for example, high-level signaling and broadcasting signaling). For example, FIG. 5a is a schematic diagram showing the correspondence between the transmission beam of the base station and the downlink control channel transmission resource in a case of M=16 and N=4. Different transmission beams for the control channel are grouped in a fixed grouping manner, and have a one-to-one correspondence with different downlink control channel transmission resources respectively.

Since not obtaining information on the actual transmission beam for the control channel, the receiving end will determine a control channel receiving resource based on the candidate transmission beams obtained by the measuring, and will monitor and blindly detect the control channel of the terminal on a control channel receiving resource corresponding to a candidate transmission beam according to a descending order of the priorities of the candidate transmission beams. For example, in a case that the candidate transmission beams of the control channel are beam3 and beam4, and the priority of beam3 is higher than that of beam4, then the terminal will firstly monitor and blindly detect the control channel of the terminal on the control channel receiving resource corresponding to beam3, that is, the resource 0. If the control channel of the terminal is received on the resource 0, the control channel of the terminal is no longer monitored and blindly detected on the control channel resource corresponding to beam4. Alternatively, if the control channel of the terminal is not received on the resource 0, the control channel of the terminal is monitored and blindly detected on the control channel resource corresponding to beam4, that is, the resource 1.

With the foregoing embodiment, by predefining the relationship between the first type of transmission resources and the second type of transmission resources, the second type of transmission resources can be rapidly determined based on the first type of transmission resources, thereby completing the transmission of the control channel, and improving transmission efficiency of the control channel.

Through the description of the above embodiment, those skilled in the art will clearly understand that the method according to the above embodiment can be implemented with software along with a necessary general hardware platform, or of course with hardware. In many cases, a better implementation is realized with software along with a necessary general hardware platform. Based on such understanding, a part of the technical solution of the present disclosure, which essentially contributes to the prior art, may be embodied in the form of a software product. The computer software product is stored in a storage medium (such as ROM/RAM, a magnetic disk, an optical disc), and includes a number of instructions for causing a terminal device (which may be a cell phone, a computer, a server, or a network device or the like) to perform the method described in various embodiments of the present disclosure.

Second Embodiment

Figure 6:
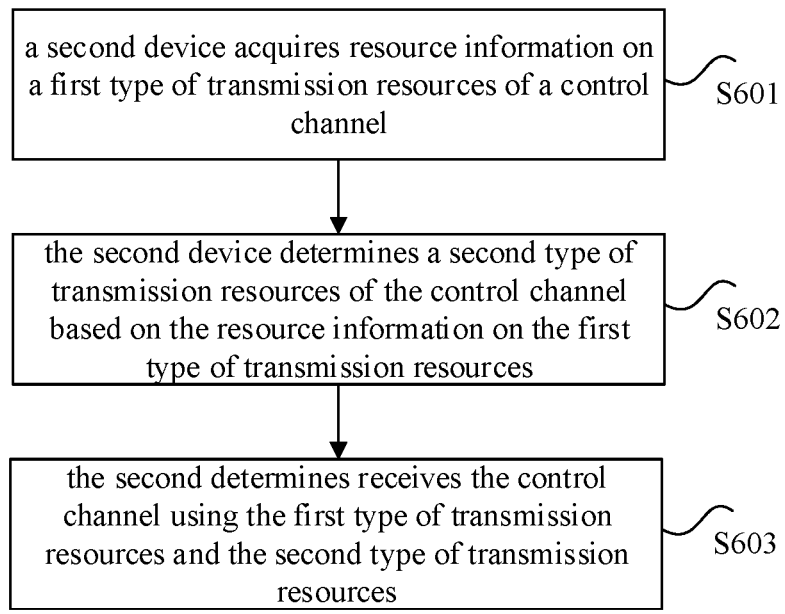
FIG. 6 is a flowchart of a method for receiving a control channel according to an embodiment of the present disclosure.

FIG. 6 is a flowchart of a method for receiving a control channel according to an embodiment of the present disclosure. As shown in FIG. 6, the method includes steps S601 to S603.

In step S601, a second device acquires resource information on a first type of transmission resources of a control channel.

The above control channel is a physical channel for transmitting control information.

In step S602, the second device determines a second type of transmission resources of the control channel based on the resource information on the first type of transmission resources. The second type of transmission resources is predefined and is different from the first type of transmission resources.

In step S603, the second determines receives the control channel using the first type of transmission resources and the second type of transmission resources.

With the above embodiment, the second device acquires the resource information on the first type of transmission resources of the control channel; the second device determines the second type of transmission resources of the control channel based on the resource information on the first type of transmission resources, wherein the second type of transmission resources is different from the first type of transmission resources; the second device receives the control channel using the first type of transmission resources and the second type of transmission resources, thereby solving the technical problem in the related art that the transmission efficiency of the control channel is low due to the blind detection by the terminal on the control channel, and improving the transmission efficiency of the control channel.

It should be noted that the first device is a transmitting end of the control channel, and the second device is a receiving end of the control channel. For example, for downlink transmission in a cellular network system, the first device is a base station, while the second device is a terminal. For uplink transmission in a cellular network system, the first device is a terminal, while correspondingly the second device is a base station. In device-to-device (D2D) communications, the first device is terminal 1, while the second device is terminal 2.

In the above embodiment, the first type of transmission resources include at least one of a first transmission beam actually used for transmitting the control channel, a second transmission beam alternatively used for transmitting the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by a first demodulation reference signal, and a frequency domain resource occupied by the first demodulation reference signal. The second demodulation reference signal resource includes at least one of a second demodulation reference signal port, a second demodulation reference signal sequence, a parameter for generating the second demodulation reference signal sequence, a time domain resource occupied by a second demodulation reference signal, and a frequency domain resource occupied by the second demodulation reference signal. The first transmission beam is characterized by at least one of the following information: an identity of the first transmission beam, an identity of a beam group in which the first transmission beam is located, precoding corresponding to the first transmission beam, and a beamforming weight corresponding to the first transmission beam. The second transmission beam is characterized by at least one of the following information: an identity of the second transmission beam, an identity of a beam group in which the second transmission beam is located, precoding corresponding to the second transmission beam, and a beamforming weight corresponding to the second transmission beam.

Optionally, the second type of transmission resources includes at least one of a time domain resource location of the control channel, a time domain duration of the control channel, a frequency domain resource location of the control channel, a frequency domain bandwidth of the control channel, and a code domain resource of the control channel.

The above time domain resource location of the control channel includes at least one of a time domain start location or a time domain end location of the control channel. The frequency domain resource location of the control channel includes at least one of a frequency domain start location or a frequency domain end location of the control channel.

Before the second device acquires the resource information on the first type of transmission resources of the control channel in step S601, the second device may transmit feedback information to the first device upon receiving a measurement reference signal indicating measured channel quality from the first device. The feedback information carries the resource information on the first type of transmission resources.

Specifically, the second device transmitting the feedback information to the first device includes: upon receiving the measurement reference signal indicating measured channel quality from the first device, transmitting feedback information for feeding back the channel quality to the first device. The measurement reference signal is used to measure the channel quality between the first device and the second device.

It should be noted that in the feedback information, different first transmission beams are set with different priorities, different second transmission beams are set with different priorities, different first demodulation reference signal resources are set with different priorities, and different second demodulation reference signal resources are set with different priorities.

In the step S601, the second device acquiring the resource information on the first type of transmission resources of the control channel includes: the second device receiving signaling notified by the first device, wherein the signaling includes at least one of high-layer signaling, broadcasting signaling and physical layer control signaling; and the second device acquiring the resource information on the first type of transmission resources carried in the signaling.

In the step S602, the second device determining the second type of transmission resources of the control channel based on the resource information on the first type of transmission resources includes: the second device determining the corresponding second type of transmission resources based on the resource information on the first type of transmission resources according to a preset relationship between the first type of transmission resources and the second type of transmission resources. The preset relationship is prearranged between the first device and the second device, or indicated to the first device and the second device by a network side through signaling.

The above preset relationship may be a one-to-one correspondence or a many-to-one correspondence. In the one-to-one correspondence, one unit of resources in the first type of transmission resources corresponds to one unit of resources in the second type of transmission resources. In the many-to-one correspondence, multiple units of resources in the first type of transmission resources correspond to one unit of resources in the second type of transmission resources.

The above preset relationship may also be a predefined functional relationship, and the functional relationship is used to determine the second type of transmission resources based on the first type of transmission resources.

How the receiving end receives the control channel has been described in detail in the above embodiment, and will not be described repeatedly herein.

Through the description of the above embodiment, those skilled in the art will clearly understand that the method according to the above embodiment can be implemented with software along with a necessary general hardware platform, or of course with hardware. In many cases, a better implementation is realized with software along with a necessary general hardware platform. Based on such understanding, a part of the technical solution of the present disclosure, which essentially contributes to the prior art, may be embodied in the form of a software product. The computer software product is stored in a storage medium (such as ROM/RAM, a magnetic disk, an optical disc), and includes a number of instructions for causing a terminal device (which may be a cell phone, a computer, a server, or a network device or the like) to perform the method described in various embodiments of the present disclosure.

Third Embodiment

A device for transmitting a control channel is also provided according to the embodiment of the present disclosure. The device is used to carry out the above embodiments and preferred implementations, and the description already given above is omitted. The term "module" used below may be a combination of software and/or hardware for implementing a predetermined function. The device described in the following embodiment is preferably implemented with software; however, hardware or a combination of software and hardware is also possible and contemplated.

Figure 7:
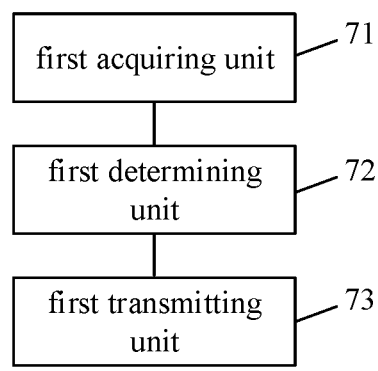
FIG. 7 is a schematic diagram of a device for transmitting a control channel according to an embodiment of the present disclosure.

FIG. 7 is a schematic diagram of a device for transmitting a control channel according to an embodiment of the present disclosure. As shown in FIG. 7, the device may include a first acquiring unit 71, a first determining unit 72 and a first transmitting unit 73.

The first acquiring unit 71 is configured to acquire resource information on a first type of transmission resources of a control channel through the first terminal.

The first determining unit 72 is configured to control the first terminal to determine a second type of transmission resources of the control channel based on the resource information on the first type of transmission resources. The second type of transmission resources is predefined and different from the first type of transmission resources.

The first transmitting unit 73 is configured to control the first device to transmit a control channel to a second device using the first type of transmission resources and the second type of transmission resources.

According to the above embodiment, the first acquiring unit 71 acquires resource information on a first type of transmission resources of a control channel through the first terminal, and the first determining unit 72 controls the first terminal to determine a second type of transmission resources of the control channel based on the resource information on the first type of transmission resources, wherein the second type of transmission resources is different from the first type of transmission resource; and the first transmitting unit 73 controls the first device to transmit a control channel to a second device using the first type of transmission resources and the second type of transmission resources, thereby solving the technical problem in the related art that the transmission efficiency of the control channel is low due to the blind detection by the terminal on the control channel, and improving the transmission efficiency of the control channel.

It should be noted that the first device is a transmitting end of the control channel, and the second device is a receiving end of the control channel. For example, for downlink transmission in a cellular network system, the first device is a base station, while correspondingly the second device is a terminal. For uplink transmission in a cellular network system, the first device is a terminal, while correspondingly the second device is a base station. In device-to-device (D2D) communication, the first device is terminal 1, while correspondingly the second device is terminal 2.

In the above embodiment, the first type of transmission resources includes at least one of a first transmission beam actually used for sending the control channel, a second transmission beam alternatively used for sending the control channel, i.e. a transmission beam which may be used for sending the control channel, a first demodulation reference signal resource actually used for transmitting the control channel, and a second demodulation reference signal resource alternatively used for transmitting the control channel, i.e. a demodulation reference signal which may be used for transmitting the control channel.

The above first demodulation reference signal resource includes at least one of a first demodulation reference signal port, a first demodulation reference signal sequence, a parameter for generating the first demodulation reference signal sequence, a time domain resource occupied by the first demodulation reference signal, and a frequency domain resource occupied by the first demodulation reference signal. The second demodulation reference signal resource includes at least one of a second demodulation reference signal port, a second demodulation reference signal sequence, a parameter for generating the second demodulation reference signal sequence, a time domain resource occupied by the second demodulation reference signal, and a frequency domain resource occupied by the second demodulation reference signal. The first transmission beam is characterized by at least one of the following information: an identity of the first transmission beam, an identity of a beam group in which the first transmission beam is located, precoding corresponding to the first transmission beam, and a beamforming weight corresponding to the first transmission beam. The second transmission beam is characterized by at least one of the following information: an identity of the second transmission beam, an identity of a beam group in which the second transmission beam is located, precoding corresponding to the second transmission beam, and a beamforming weight corresponding to the second transmission beam.

It should be noted that the transmission beam for the control channel refers to a beam sent after the control channel is weighted with precoding weights or beamforming weights, and different precoding weights or beamforming weights correspond to different transmission beams.

Optionally, the second type of transmission resources includes at least one of a time domain resource location of the control channel, a time domain duration of the control channel, a frequency domain resource location of the control channel, a frequency domain bandwidth of the control channel, and a code domain resource of the control channel.

The above code domain resource of the control channel refers to information in which code domains, for example, an Orthogonal Cover Code (OCC), are added into transmission of an information bits of the control channel. Different code domain resources may be used to transmit different control channels.

Specifically, the time domain resource location of the control channel includes at least one of a time domain start location or a time domain end location of the control channel. The frequency domain resource location of the control channel includes at least one of a frequency domain start location or a frequency domain end location of the control channel.

Optionally, the first acquiring unit 71 includes a receiving module configured to control the first device to receive feedback information from the second device. The feedback information carries the resource information on the first type of transmission resources.

The above receiving module includes: a transmitting sub-module configured to control the first device to transmit a measurement reference signal to the second device, wherein the measurement reference signal is used to measure channel quality between the first device and the second device; and a receiving sub-module configured to receive, through the first device, feedback information for feeding back the channel quality from the second device, wherein the feedback information carries the resource information on the first type of transmission resources.

After acquiring the resource information on the first type of transmission resources of the control channel, the first device may notify the second device of the resource information on the first type of transmission resources through signaling. The signaling includes at least one of high-layer signaling, broadcasting signaling, and physical layer control signaling.

In the feedback information, different first transmission beams are set with different priorities, different second transmission beams are set with different priorities, different first demodulation reference signal resources are set with different priorities, and different second demodulation reference signal resources are set with different priorities.

Optionally, the first determining unit 72 includes a first determining module configured to control the first device to determine the corresponding second type of transmission resources based on the resource information on the first type of transmission resources, according to a preset relationship between the first type of transmission resources and the second type of transmission resources. The preset relationship is prearranged by the first device and the second device, or is indicated to at least one of the first device or the second device by the network side through signaling.

The above preset relationship may be a one-to-one correspondence or a many-to-one correspondence. In the oneto-one correspondence, one unit of resources in the first type of transmission resources corresponds to one unit of resources in the second type of transmission resources. In the many-to-one correspondence, multiple units of resources in the first type of transmission resources correspond to one unit of resources in the second type of transmission resources.

The above preset relationship may also be a predefined functional relationship, and the functional relationship is used to determine the second type of transmission resources based on the first type of transmission resources.

The device in the present disclosure further includes a notifying unit configured to control the first device to notify the second device of the resource information on the first type of transmission resources through signaling. The signaling includes at least one of high-layer signaling, broadcasting signaling and physical layer control signaling.

It should be noted that the above individual modules may be implemented with software or hardware. In a case that the above individual modules are implemented with hardware, the modules may be implemented in the following manner without being limited thereto: the above modules are all provided in the same processor, or the above modules may be provided in different processors in any combination.

Fourth Embodiment

A device for receiving a control channel is further provided according to an embodiment of the present disclosure. The device is used to carry out the above embodiments and preferred implementations, and the description already given above is omitted. The term "module" used below may be a combination of software and/or hardware for implementing a predetermined function. The device described in the following embodiment is preferably implemented with software; however, hardware or a combination of software and hardware is also possible and contemplated.

Figure 8:
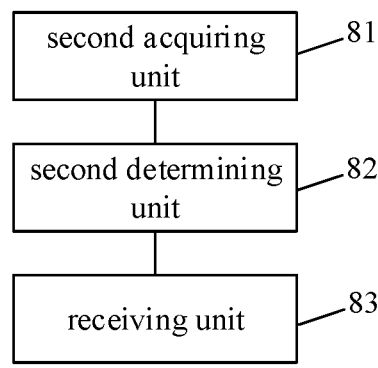
FIG. 8 is a schematic diagram of a device for receiving a control channel according to an embodiment of the present disclosure.

FIG. 8 is a schematic diagram of a device for receiving a control channel according to an embodiment of the present disclosure. As shown in FIG. 8, the device may include a second acquiring unit 81, a second determining unit 82 and a receiving unit 83.

The second acquiring unit 81 is configured to acquire resource information on a first type of transmission resources of a control channel through a second device.

The second determining unit 82 is configured to control the second device to determine a second type of transmission resources of the control channel based on the resource information on the first type of transmission resources. The second type of transmission resources is predefined and is different from the first type of transmission resources.

The receiving unit 83 is configured to control the second device to receive the control channel using the first type of transmission resources and the second type of transmission resources.

With the above embodiment, the second device 81 acquires resource information on a first type of transmission resources of a control channel, and the second device determines a second type of transmission resources of the control channel based on the resource information on the first type of transmission resources, wherein the second type of transmission resources is different from the first type of transmission resource; and the second device receives the control channel using the first type of transmission resources and the second type of transmission resources, thereby solving the technical problem in the related art that the transmission efficiency of the control channel is low due to the blind detection by the terminal on the control channel, and improving the transmission efficiency of the control channel.

It should be noted that the first device is a transmitting end of the control channel, and the second device is a receiving end of the control channel. For example, for downlink transmission in a cellular network system, the first device is a base station, while correspondingly the second device is a terminal. For uplink transmission in a cellular network system, the first device is a terminal, while correspondingly the second device is a base station. In device-to-device (D2D) communication, the first device is terminal 1, while correspondingly the second device is terminal 2.

In the above embodiment, the first type of transmission resources includes at least one of a first transmission beam actually used for transmitting the control channel, a second transmission beam alternatively used for transmitting the control channel, a first demodulation reference signal resource actually used for transmitting the control channel, and a second demodulation reference signal resource alternatively used for transmitting the control channel.

Optionally, the first demodulation reference signal resource includes at least one of a first demodulation reference signal port, a first demodulation reference signal sequence, a parameter for generating the first demodulation reference signal sequence, a time domain resource occupied by the first demodulation reference signal, and a frequency domain resource occupied by the first demodulation reference signal. The second demodulation reference signal resource includes at least one of a second demodulation reference signal port, a second demodulation reference signal sequence, a parameter for generating the second demodulation reference signal sequence, a time domain resource occupied by the second demodulation reference signal, and a frequency domain resource occupied by the second demodulation reference signal. The first transmission beam is characterized by at least one of the following information: an identity of the first transmission beam, an identity of a beam group in which the first transmission beam is located, precoding corresponding to the first transmission beam, and a beamforming weight corresponding to the first transmission beam. The second transmission beam is characterized by at least one of the following information: an identity of the second transmission beam, an identity of a beam group in which the second transmission beam is located, precoding corresponding to the second transmission beam, and a beamforming weight corresponding to the second transmission beam.

Optionally, the second type of transmission resources includes at least one of a time domain resource location of the control channel, a time domain duration of the control channel, a frequency domain resource location of the control channel, a frequency domain bandwidth of the control channel, and a code domain resource of the control channel.

The above time domain resource location of the control channel includes at least one of a time domain start location or a time domain end location of the control channel. The frequency domain resource location of the control channel includes at least one of a frequency domain start location or a frequency domain end location of the control channel.

Optionally, the above device further includes a second transmitting unit configured to, before the second device acquires the resource information on the first type of transmission resources of the control channel, control the second device to transmit feedback information to the first device. The feedback information carries the resource information on the first type of transmission resources.

The above second transmitting unit includes a transmitting module configured to control the second device, upon receiving a measurement reference signal indicating measured channel quality from the first device, to transmit the feedback information for feeding back the channel quality to the first device, before the second device acquires the resource information on the first type of transmission resources of the control channel. The feedback information carries the resource information on the first type of transmission resources.

In the above feedback information, different first transmission beams are set with different priorities, different second transmission beams are set with different priorities, different first demodulation reference signal resources are set with different priorities, and different second demodulation reference signal resources are set with different priorities.

Optionally, the second acquiring unit 81 includes: a second receiving module configured to receive signaling notified by the first device, through the second device, wherein the signaling includes at least one of high-layer signaling, broadcasting signaling and physical layer control signaling; and an acquiring module configured to acquire the resource information on the first type of transmission resources carried in the signaling, through the second device.

Optionally, the second determining unit 82 includes a second determining module configured to control the second device to determine the corresponding second type of transmission resources based on the resource information on the first type of transmission resources, according to a preset relationship between the first type of transmission resources and the second type of transmission resources. The preset relationship is prearranged between the first device and the second device, or indicated to the first device and the second device by the network side through signaling.

The above preset relationship may be a one-to-one correspondence or a many-to-one correspondence. In the one-to-one correspondence, one unit of resources in the first type of transmission resources corresponds to one unit of resources in the second type of transmission resources. In the many-to-one correspondence, multiple units of resources in the first type of transmission resources correspond to one unit of resources in the second type of transmission resources.

The above preset correspondence may also be a predefined functional relationship, and the functional relationship is used to determine the second type of transmission resources based on the first type of transmission resources.

It should be noted that the above individual modules may be implemented with software or hardware. In a case that the above individual modules are implemented with hardware, the modules may be implemented in the following manner without being limited thereto: the above modules are all provided in the same processor, or the above modules may be provided in different processors in any combination.

Fifth Embodiment

A storage medium is further provided according to an embodiment of the present disclosure. Optionally, the above storage medium in the embodiment may be used to store program codes for executing the following steps.

In S11, a first device is controlled to acquire resource information on a first type of transmission resources of a control channel.

In S12, the first terminal is controlled to determine a second type of transmission resources of the control channel based on the resource information on the first type of transmission resources. The second type of transmission resources is different from the first type of transmission resources.

In S13, the first device is controlled to transmit a control channel to a second device using the first type of transmission resources and the second type of transmission resources.

Optionally, the storage medium is further used to store program codes for executing the following steps.

In S21, a second device is controlled to acquire resource information on a first type of transmission resources of a control channel.

In S22, the second device is controlled to determine a second type of transmission resources of the control channel based on the resource information on the first type of transmission resources. The second type of transmission resources is different from the first type of transmission resources.

In S23, the second device is controlled to determine to receive the control channel using the first type of transmission resources and the second type of transmission resources.

Optionally, in the embodiment, the above storage medium may include, but is not limited to, a USB flash drive, a Read-Only Memory (ROM), a Random Access Memory (RAM), a mobile hard disk, a magnetic disk, or an optical disk or a medium which may store program codes.

Optionally, in this embodiment, according to the program codes stored in the storage medium, the processor is configured to: control the first device to acquire resource information on the first type of transmission resources of the control channel; control the first device to determine a second type of transmission resources of the control channel based on the resource information on the first type of transmission resources, wherein the second type of transmission resources is different from the first type of transmission resource; and control the first device to transmit a control channel to the second device using the first type of transmission resources and the second type of transmission resources.

Optionally, in this embodiment, according to the program codes stored in the storage medium, the processor is configured to: control the second device to acquire resource information on the first type of transmission resources of the control channel; control the second device to determine a second type of transmission resources of the control channel based on the resource information on the first type of transmission resources, wherein the second type of transmission resources is different from the first type of transmission resource; and control the second device to receive the control channel using the first type of transmission resources and the second type of transmission resources.

Optionally, for specific examples in the embodiment, reference may be made to examples described in the foregoing embodiments and the optional implementation, and no repeated description is given herein.

It is apparent to those skilled in the art that the various modules or steps of the present disclosure described above can be implemented by a general-purpose computing device, and may be integrated in a single computing device or distributed across a network consisting of multiple computing devices. Optionally, the modules or steps may be implemented by program codes executable by the computing device. Therefore, the modules or steps may be stored in the memory device and executed by the computing device. In some cases, the steps as shown or described may be executed in a different order from the order illustrated herein, or manufactured respectively as individual integrated circuit modules, or multiple modules or steps thereof can be manufactured as a single integrated circuit module. As such, the present disclosure is not limited to any specific combination of hardware and software.

Only the preferred embodiments of the present disclosure are described above, which are not intended to limit the present disclosure, and various modifications and changes can be made to the present disclosure by those skilled in the art. Any modifications, equivalent substitutions, improvements or the like made within the spirit and principle of the present disclosure will fall within the scope of protection of the present disclosure.

INDUSTRIAL APPLICABILITY

The above technical solutions according to the embodiments of the present disclosure may be applied to a receiving process for a control channel, in which a first terminal acquires resource information on a first type of transmission resources of the control channel, the first device determines a second type of transmission resources of the control channel based on the resource information on the first type of transmission resources, wherein the second type of transmission resources is different from the first type of transmission resources, and the first device transmits a control channel to a second device using the first type of transmission resources and the second type of transmission resources, thereby solving the technical problem in the related art that the transmission efficiency of the control channel is low due to the blind detection by the terminal on the control channel, and improving the transmission efficiency of the control channel.

What is claimed is:

1. A wireless communication method, comprising:
   acquiring, by a first device, resource information on a first type of transmission resources of a control channel based on a descending order of priorities associated with a plurality of first type of transmission resources;
   determining, by the first device, a second type of transmission resources of the control channel based on the resource information on the first type of transmission resources, wherein the second type of transmission resources is different from the first type of transmission resources, and wherein the second type of transmission resources is within a range of a plurality of second type of transmission resources; and
   transmitting, by the first device, the control channel to a second device using the first type of transmission resources and the second type of transmission resources.

2. The method according to claim 1, wherein the first type of transmission resources comprises
   a transmission beam used for sending the control channel.

3. The method according to claim 1, wherein the second type of transmission resources comprises
   a time domain resource location of the control channel.

4. A wireless communication method, comprising:
   acquiring, by a device, resource information on a first type of transmission resources of a control channel;
   determining, by the device, a second type of transmission resources of the control channel based on the resource information on the first type of transmission resources,
   wherein the second type of transmission resources is different from the first type of transmission resource,
   wherein the second type of transmission resources is within a range of a plurality of second type of transmission resources determined by the device, and
   wherein the second type of transmission resources is determined based on a descending order of priorities associated with a plurality of first type of transmission resources; and
   receiving, by the device, the control channel using the first type of transmission resources and the second type of transmission resources.

5. The method according to claim 4, wherein the first type of transmission resources comprises
   a transmission beam used for receiving the control channel.

6. The method according to claim 4, wherein the second type of transmission resources comprises
   a time domain resource location of the control channel.

7. A device, comprising:
   a processor configured to:
   acquire resource information on a first type of transmission resources of a control channel based on a descending order of priorities associated with a plurality of first type of transmission resources;
   determine a second type of transmission resources of the control channel based on the resource information on the first type of transmission resources, wherein the second type of transmission resources is different from the first type of transmission resource, and wherein the second type of transmission resources is within a range of a plurality of second type of transmission resources; and
   transmit the control channel to a second device using the first type of transmission resources and the second type of transmission resources.

8. The device according to claim 7, wherein the first type of transmission resources comprises
   a transmission beam used for sending the control channel.

9. A device, comprising:
   a processor configured to:
   acquire resource information on a first type of transmission resources of a control channel;
   determine a second type of transmission resources of the control channel based on the resource information on the first type of transmission resources, wherein the second type of transmission resources is different from the first type of transmission resource,
   wherein the second type of transmission resources is within a range of a plurality of second type of transmission resources determined by the device, and
   wherein the second type of transmission resources is determined based on a descending order of priorities associated with a plurality of first type of transmission resources; and
   receive the control channel using the first type of transmission resources and the second type of transmission resources.

10. The device according to claim 9, wherein the first type of transmission resources comprises
    a transmission beam used for receiving the control channel.

11. A non-transitory computer readable storage medium, comprising stored programs which, when executed by a processor, perform a method comprising:

acquiring, by a first device, resource information on a first type of transmission resources of a control channel based on a descending order of priorities associated with a plurality of first type of transmission resources;

determining, by the first device, a second type of transmission resources of the control channel based on the resource information on the first type of transmission resources, wherein the second type of transmission resources is different from the first type of transmission resources, and wherein the second type of transmission resources is within a range of a plurality of second type of transmission resources; and transmitting, by the first device, the control channel to a second device using the first type of transmission resources and the second type of transmission resources.

12. The non-transitory computer readable storage medium of claim 11, wherein the first type of transmission resources comprises a transmission beam used for sending the control channel.

13. The non-transitory computer readable storage medium of claim 11, wherein the second type of transmission resources comprises a time domain resource location of the control channel.

14. A non-transitory computer readable storage medium, comprising stored programs which, when executed by a processor, perform a method comprising:

acquiring, by a device, resource information on a first type of transmission resources of a control channel;

determining, by the device, a second type of transmission resources of the control channel based on the resource information on the first type of transmission resources, wherein the second type of transmission resources is different from the first type of transmission resource, wherein the second type of transmission resources is within a range of a plurality of second type of transmission resources determined by the device, and wherein the second type of transmission resources is determined based on a descending order of priorities associated with a plurality of first type of transmission resources; and receiving, by the device, the control channel using the first type of transmission resources and the second type of transmission resources.

15. The non-transitory computer readable storage medium of claim 14, wherein the first type of transmission resources comprises a transmission beam used for sending the control channel.

16. The non-transitory computer readable storage medium of claim 14, wherein the second type of transmission resources comprises a time domain resource location of the control channel.

17. The device according to claim 7, wherein the second type of transmission resources comprises a time domain resource location of the control channel.

18. The device according to claim 9, wherein the second type of transmission resources comprises a time domain resource location of the control channel.

* * * * *